(12) United States Patent
Nelson

(10) Patent No.: US 12,061,442 B2
(45) Date of Patent: Aug. 13, 2024

(54) METHOD FOR DETERMINING AUTHENTICITY USING IMAGES THAT EXHIBIT PARALLAX

(71) Applicant: DE LA RUE AUTHENTICATION SOLUTIONS INC., Wilmington, DE (US)

(72) Inventor: Brett Ronald Nelson, Logan, UT (US)

(73) Assignee: DE LA RUE AUTHENTICATION SOLUTIONS INC., Wilmington, DE (US)

( * ) Notice: Subject to any disclaimer, the term of this patent is extended or adjusted under 35 U.S.C. 154(b) by 0 days.

(21) Appl. No.: 17/857,641

(22) Filed: Jul. 5, 2022

(65) Prior Publication Data

US 2022/0334535 A1  Oct. 20, 2022

Related U.S. Application Data

(63) Continuation of application No. 15/998,926, filed as application No. PCT/IB2017/050872 on Feb. 16, 2017, now Pat. No. 11,409,239.

(Continued)

(51) Int. Cl.
*G03H 1/04* (2006.01)
*B42D 25/328* (2014.01)
(Continued)

(52) U.S. Cl.
CPC ........... *G03H 1/041* (2013.01); *B42D 25/328* (2014.10); *G03H 1/0011* (2013.01);
(Continued)

(58) Field of Classification Search
CPC .... G03H 1/041; G03H 1/0011; G03H 1/0244; G03H 1/18; G03H 1/20;
(Continued)

(56) References Cited

U.S. PATENT DOCUMENTS 9,058,535 B2  6/2015 Guigan
10,083,353 B2  9/2018 Becker et al.
(Continued)

FOREIGN PATENT DOCUMENTS

DE  4131964 A1  4/1993
EP  1 852 752 A2  11/2007
(Continued)

OTHER PUBLICATIONS

Jun. 1, 2017 International Search Report issued in International Patent Application No. PCT/IB2017/050872.
(Continued)

*Primary Examiner* — Stephone B Allen
*Assistant Examiner* — Jyotsna V Dabbi
(74) *Attorney, Agent, or Firm* — Oliff PLC

(57) ABSTRACT

A method for determining the validity of a parallax image including receiving a captured two-dimensional image of a parallax image having at least three target identifiers, where at least two target identifiers are located at different depth planes in the parallax image; identifying the at least three target identifiers in the captured two-dimensional image of the parallax image and determining the spatial relationship between the at least three target identifiers in the two-dimensional image of the parallax image; comparing the spatial relationship of the at least three target identifiers in the captured two-dimensional image of the parallax image against a predetermined spatial relationship of the at least three target identifiers that indicates authenticity; and adjudicating the authenticity of the parallax image based on the degree of difference between the spatial relationship of the at least three target identifiers in the captured two-dimensional image and the predetermined spatial relationship.

9 Claims, 3 Drawing Sheets

Related U.S. Application Data

(60) Provisional application No. 62/296,316, filed on Feb. 17, 2016.

(51) Int. Cl.
*G03H 1/00* (2006.01)
*G03H 1/02* (2006.01)
*G03H 1/18* (2006.01)
*G06K 19/16* (2006.01)
*G07D 7/00* (2016.01)

(52) U.S. Cl.
CPC ............ *G03H 1/0244* (2013.01); *G03H 1/18* (2013.01); *G06K 19/16* (2013.01); *G07D 7/0032* (2017.05); *G03H 2001/0016* (2013.01); *G03H 2001/0421* (2013.01)

(58) Field of Classification Search
CPC ... G03H 2001/0016; G03H 2001/0421; G06K 19/16; G06K 19/10; G07D 7/0032; B42D 25/328; B42D 2035/34; Y10S 283/901
USPC ............................................................ 359/2
See application file for complete search history.

(56) References Cited

U.S. PATENT DOCUMENTS

| | | |
|---|---|---|
| 10,346,682 B2 | 7/2019 | Touret et al. |
| 2002/0080994 A1 | 6/2002 | Lofgren et al. |
| 2005/0025338 A1* | 2/2005 | Zhao ..................... G06T 1/0028 |
| | | 382/100 |
| 2012/0176477 A1 | 7/2012 | Givon |
| 2013/0345718 A1 | 12/2013 | Crawford et al. |
| 2016/0378061 A1* | 12/2016 | Reinhardt ............... H04W 4/50 |
| | | 382/154 |

FOREIGN PATENT DOCUMENTS

| | | | |
|---|---|---|---|
| EP | 2695147 B1 | 3/2019 | |
| JP | 2002-132124 A | 5/2002 | |
| WO | 02/003104 A2 | 1/2002 | |
| WO | WO-2015010881 A1 * | 1/2015 | ........... G03H 1/0011 |

OTHER PUBLICATIONS

Sep. 19, 2019 Office Action issued in European Patent Application No. 17708884.6.

\* cited by examiner

METHOD FOR DETERMINING AUTHENTICITY USING IMAGES THAT EXHIBIT PARALLAX

CROSS-REFERENCE TO RELATED APPLICATIONS

This is a Continuation of application Ser. No. 15/998,926 filed Aug. 17, 2018, which in turn is a National Phase Application of PCT Application No. PCT/IB2017/050872 filed Feb. 16, 2017, which claims the benefit of Provisional Application No. 62/296,316 filed Feb. 17, 2016. The disclosure of the prior applications is hereby incorporated by reference herein in its entirety.

TECHNICAL FIELD

This disclosure relates to authentication, brand protection, anti-counterfeiting, and to methods for authentication designed to be used with images that exhibit parallax such as certain types of holograms. More specifically, the disclosure relates to methods for validation based on holograms exhibiting parallax, and to the use of holographic elements for conveying information or data. Authentication methods using particular devices such as smart phone cameras and flashes, communication interfaces, computer processors, and downloadable applications for smart phones, tablets, and computers are also disclosed.

BACKGROUND OF THE DISCLOSURE

Authentication, brand protection and anti-counterfeiting have a wide range of applications. These relate generally to verifying the authenticity of commercial goods, consumable products including food and beverages, medicines, clothing and accessories, electronic devices, currency, passports and other government or non-governmental ID cards (e.g., academic IDs, corporate IDs), tickets, key cards, documents, and other uses where authentication, brand protection, or anti-counterfeiting is necessary or desirable. The term "authentication" may be used to refer to all related applications such as brand protection and anti-counterfeiting collectively. Authentication works by verifying the provenance of an item or document and therefore verifying that the item or document is not a counterfeit, knockoff or fake.

Images used in authentication possess increasing value in relation to the difficulty of copying or mimicking them and the relative simplicity of equipment and methods needed for verifying their authenticity. For example, holograms that require complex or expensive equipment for authentication will have reduced ranges of applications for economic and other considerations, especially if the equipment is not easily portable. Holograms may contain overt and/or covert elements. Simple holograms, such as two-dimensional embossed or color-shift holograms, have overt elements such as appearance or disappearance of an image or color shift as the hologram is pivoted at different angles to incident light. Simple holograms commonly applied on credit cards are examples of two-dimensional embossed holograms. Such holographic elements are overt and rely on subjective or intuitive verification by a human observer. These holograms are relatively easy and inexpensive to copy or mimic, providing little real security for end users, merchants, or others who may need to rely upon them.

Holograms exhibiting parallax are generally more difficult to copy or imitate convincingly than embossed holograms. To produce a hologram that exhibits parallax, an object to be imaged is illuminated with collimated light (e.g., from a laser) and a light sensitive recording medium (e.g., a photographic plate) is positioned so as to receive light reflected from the object. Each point on the object reflects light to the entire recording medium, and each point on the medium receives light from the entire object. This beam of reflected light is known as the object beam. At the same time, a portion of the collimated light is beamed by a mirror directly to the medium, by-passing the object. This beam is known as the reference beam. What is recorded on the recording medium is the interference pattern that results from the interaction of the reference beam and the object beam impinging on the medium. When the processed recording medium is subsequently illuminated and observed appropriately, the light from the illuminating source is diffracted by the hologram to reproduce the wave-front that originally reached the medium from the object, so that the hologram resembles a window through which a virtual image of the object is observed in full three-dimensional form, complete with parallax.

There are continuing and growing needs for images that are increasingly difficult to counterfeit, copy or imitate convincingly, and there is also a need for systems and methods that can validate images with commonly available portable equipment. There are also continuing and growing needs for secure digital verification image systems for objective, rapid, and reliable authentication using simple portable equipment.

SUMMARY OF THE DISCLOSURE

According to a first aspect of the invention there is provided a method for determining the validity of a parallax image, comprising: receiving a captured two-dimensional image of a parallax image having at least three target identifiers, wherein at least two target identifiers are located at different depth planes in the parallax image; identifying the at least three target identifiers in the captured two-dimensional image of the parallax image and determining the spatial relationship between the at least three target identifiers in the two-dimensional image of the parallax image; comparing the spatial relationship of the at least three target identifiers in the captured two-dimensional image of the parallax image against a predetermined spatial relationship of the at least three target identifiers that indicates authenticity; and adjudicating the authenticity of the parallax image based on the degree of difference between the spatial relationship of the at least three target identifiers in the captured two-dimensional image of the parallax image and the predetermined spatial relationship of the at least three target identifiers.

Typically, the spatial relationship of the at least three target identifiers comprises a ratio of the lengths of vectors linking the target identifiers. The spatial relationship of the at least three target identifiers in the captured two-dimensional image of the parallax image may typically be compared against a digital model of the spatial relationship between the at least three target identifiers of a master parallax image against which the authenticity of the parallax image is being determined. Such a digital model may typically comprise the predetermined spatial relationship.

The method may further comprise the steps of capturing multiple two-dimensional images of a master parallax image taken from multiple perspectives; identifying at least three target identifiers in each captured two-dimensional image of the master parallax image; creating a plurality of vectors linking the target identifiers in each of the captured two-dimensional images of the master parallax image; determining the ratio of the lengths of the vectors linking the target identifiers in each of the captured two-dimensional images of the master parallax image; and generating a digital model for the master parallax image that captures the ratio of the lengths of the vectors linking the target identifiers in each of the captured two-dimensional images of the master parallax image, wherein the digital model comprises the predetermined spatial relationship. These steps are typically carried out before the receiving of the captured two-dimensional image of a parallax image.

The method may comprise the steps of creating a plurality of vectors linking the target identifiers in the captured two-dimensional image of the parallax image; and determining the ratio of the lengths of the vectors linking the target identifiers in the captured two-dimensional image of the parallax image, and wherein the step of comparing comprises: accessing the digital model for the master parallax image; comparing the vector length ratio determined from the captured two-dimensional image of the parallax image against vector length ratio values captured in the digital model for the master parallax image; and calculating the difference between the vector length ratio for the captured two-dimensional image of the parallax image and the vector length ratios from the digital model for the master parallax image; and wherein the adjudicating is based on whether the difference between the vector length ratio from the captured two-dimensional image of the parallax image and the vector length ratio from the digital model for the master parallax image are within an acceptable predetermined margin.

The method may further comprise determining the perspective relative to the master parallax image of each of the multiple two-dimensional images of the master parallax image; and inputting the coordinates of the perspective of each two-dimensional image of the master parallax image into the digital model for the master parallax image and associating such perspective coordinates with the ratio of the lengths of the vectors linking the target identifiers in each of the respective two-dimensional images of the master parallax image captured in the digital model for the master parallax image; determining the perspective relative to the parallax image of the received captured two-dimensional image of the parallax image; comparing the vector length ratio determined from the captured two-dimensional image of the parallax image against the vector length ratio captured from the digital model for the master parallax image for substantially the same perspective coordinates; calculating the difference between the vector length ratio for the captured two-dimensional image of the parallax image and the corresponding vector length ratio of the digital model for substantially the same perspective coordinates; and adjudicating the authenticity of the captured two-dimensional image of the parallax image based on whether the differences between the vector length ratio from the captured two-dimensional image of the parallax image and the vector length ratio values from the digital model for substantially the same perspective coordinates are within an acceptable predetermined margin.

The method may further comprise receiving a plurality of captured two-dimensional images of a parallax image; identifying at least three target identifiers in each of the plurality of captured two-dimensional images of the parallax image; creating a plurality of vectors linking the target identifiers in each of the plurality of captured two-dimensional images of the parallax image; and determining the ratio of the lengths of the vectors linking the target identifiers in each of the plurality of captured two-dimensional images of the parallax image; accessing the digital model for the master parallax image; comparing the vector length ratio determined from each of the plurality of captured two-dimensional images of the parallax image against vector length ratio values captured in the digital model for the master parallax image; calculating the difference between the vector length ratio for each of the plurality of captured two-dimensional images of the parallax image and the vector length ratios from the digital model for the master parallax image; and adjudicating the authenticity of the captured two-dimensional image of the parallax image based on whether the difference between the vector length ratio from each of the plurality of captured two-dimensional image of the parallax image and the vector length ratio from the digital model for the master parallax image are within an acceptable predetermined margin.

Where the method comprises receiving a plurality of captured two-dimensional images of a parallax image, the method may comprise comparing the vector length ratio determined from each of the plurality of captured two-dimensional images of the parallax image against the corresponding vector length ratio in the digital model for substantially the same perspective coordinates as each of the plurality of captured two-dimensional images of the parallax image.

Typically the parallax image is an image exhibiting parallax generated from a hologram. Preferably the parallax image exhibits full parallax. Similarly, the master parallax image is typically an image exhibiting parallax generated from a hologram. Preferably the master parallax image exhibits full parallax. At least one of the parallax image and the master parallax image may comprise a lenticular image or a micro-lens image.

In an embodiment, the parallax image may be provided on a document of value such as a passport, identity card, driving licence, bank card, bank note or security label. This advantageously allows for checking the authenticity of such a document of value and, in accordance with a second aspect of the invention there is provided method of determining the validity of a document of value comprising a parallax image, comprising the method of any of the first aspect of the invention.

In accordance with a third aspect of the invention there is provided a computer program product comprising one or more computer-readable media having thereon computer-executable instructions that, when executed by one or more processors of a computer, causes the one or more processors of the computer to perform the method of the first or second aspects.

In accordance with a fourth aspect of the invention there is provided a digitally executable authentication system for determining the validly of a parallax image that executes the steps comprising: receiving multiple two-dimensional images of a master parallax image taken from multiple perspectives; identifying at least two pairs of target identifiers in each two-dimensional image of the master parallax image; creating a plurality of vectors linking the target identifiers in each of the two-dimensional images of the master parallax image; determining the ratio of the lengths of the vectors linking the target identifiers in each of the two-dimensional images of the master parallax image; and generating a digital model that captures the ratio of the lengths of the vectors linking the target identifiers in each of the two-dimensional images of the master parallax image; receiving a captured two-dimensional image of a possible duplicate of the master parallax image; identifying at least two pairs of target identifiers in the captured two-dimensional image of the possible duplicate of the master parallax image; creating a plurality of vectors linking the target identifiers in the captured two-dimensional image of the possible duplicate of the master parallax image; and determining the comparative ratio of the lengths of the vectors linking the target identifiers in the captured two-dimensional image of the possible duplicate of the master parallax image; accessing the digital model; comparing the vector length ratio determined from the captured two-dimensional image of the possible duplicate of the master parallax image against vector ratio values captured in the digital model; calculating the difference between the vector length ratios for the captured two-dimensional image of the possible duplicate of the master parallax image and the vector length ratios of the digital model; and adjudicating the authenticity of the captured two-dimensional image of the possible duplicate of the master parallax image based on whether the differences between the vector length ratio values from the captured two-dimensional image of the possible duplicate of the master parallax image and the vector length ratio values from the digital model are within an acceptable predetermined margin.

Typically the parallax image is an image exhibiting parallax generated from a hologram. Preferably the parallax image exhibits full parallax. Similarly, the master parallax image is typically an image exhibiting parallax generated from a hologram. Preferably the master parallax image exhibits full parallax. At least one of the parallax image and the master parallax image may comprise a lenticular image or a micro-lens image.

The digitally executable authentication system may execute the steps of capturing the perspective relative to the master parallax image of each of the multiple two-dimensional images of the master parallax image; and inputting the respective coordinates of the perspective of each two-dimensional image of the master parallax image into the digital model and associating such perspective coordinates with the ratio of the lengths of the vectors linking the target identifiers in each of the respective two-dimensional images of the master parallax image; determining the perspective relative to the possible duplicate of the master parallax image of the received captured two-dimensional image of a possible duplicate of the master parallax image; comparing the vector length ratio determined from the captured two-dimensional image of the possible duplicate of the master parallax image against vector length ratio values captured in the digital model for substantially the same perspective coordinates; calculating the difference between the vector length ratio for the captured two-dimensional image of the possible duplicate of the master parallax image and the corresponding vector length ratio of the digital model for substantially the same perspective coordinates; and adjudicating the authenticity of the captured two-dimensional image of the possible duplicate of the master parallax image based on whether the difference between the vector length ratio values from the captured two-dimensional image of the possible duplicate of the master parallax image and the vector length ratio value from the digital model for substantially the same perspective coordinates are within an acceptable predetermined margin.

The digitally executable authentication system may execute the steps of receiving a plurality of captured two-dimensional images of a possible duplicate of the master parallax image; identifying at least two pairs of target identifiers in each of the plurality of captured two-dimensional images of the possible duplicate of the master parallax image; creating a plurality of vectors linking the target identifiers in each of the plurality of captured two-dimensional images of the possible duplicate of the master parallax image; and determining the comparative ratio of the lengths of the vectors linking the target identifiers in each of the plurality of captured two-dimensional images of the possible duplicate of the master parallax image; determining the perspective relative to the possible duplicate of the master parallax image of each of the plurality of received captured two-dimensional images of a possible duplicate of the master parallax image; comparing the vector length ratio determined from each of the plurality of captured two-dimensional images of the possible duplicate of the master parallax image against corresponding vector length ratio in the digital model for substantially the same perspective coordinates as each of the plurality of captured two-dimensional images of the possible duplicate of the master parallax image; calculating the difference between the vector length ratio for each of the plurality of captured two-dimensional images of the possible duplicate of the master parallax image and the corresponding vector length ratio of the digital model for substantially the same perspective coordinates; and adjudicating the authenticity of the captured two-dimensional image of the possible duplicate of the master parallax image based on whether the difference between the vector length ratio values from each of the plurality of captured two-dimensional images of the possible duplicate of the master parallax image and the corresponding vector length ratio values from the digital model for substantially the same perspective coordinates are within an acceptable predetermined margin.

In accordance with a fifth of the invention there is provided a digitally executable authentication system for determining the validity of a document of value comprising a parallax image, comprising the system of the fourth aspect.

In accordance with a sixth aspect of the invention there is provided a method for validating a hologram having parallax comprising: creating a first hologram exhibiting parallax and containing at least three target identifiers, at least two of which are located on differing depth planes; capturing still images of the first hologram from multiple viewing perspectives; recording the coordinates of the viewing perspective from which each image is captured relative to the first hologram; identifying at least two pairs of target identifiers in each of the captured images of the first hologram; generating vectors linking the at least two pairs of target identifiers in each captured image of the first hologram; determining the relative vector length ratios of the generated vectors linking the target identifiers in each image of the first hologram; recording the vector length ratios for each image along with the coordinates of the viewing perspective for each image; using the recorded vector length ratios for each image along with the image coordinates to generate a first hologram digital model that determines the vector length ratio for a complete set of possible perspectives from which the first hologram is viewed; determining whether a second hologram exhibiting parallax is an authentic duplicate of the first hologram by illuminating the second hologram with a point light source and capturing an image of the illuminated second hologram; calculating the coordinates of the viewing perspective of the captured image relative to the second hologram; identifying the at least two pairs of target identifiers that were identified in the first hologram in the captured image of the second hologram; creating vectors linking the target identifiers in the captured image of the second hologram, and determining the ratio of the lengths of the vectors linking the target identifiers in the second hologram; calculating the difference between the vector length ratio from the second hologram against the corresponding vector length ratio determined from the first hologram digital model for the perspective coordinates from which the image of the second hologram was captured; adjudicating the authenticity of the second hologram based on whether the difference between the vector length ratio from the captured image of the second hologram and the corresponding vector length ratio values from the first hologram digital model are within an acceptable predetermined margin; and communicating the authentication determination to an evaluator of the second hologram.

The capturing an image of the illuminated second hologram may be performed with a scanning device selected from cameras, scanners, and digital recorders. The scanning device may be a smart phone equipped with a camera and a point light source.

The foregoing method steps in other embodiments may optionally include at least one step for acquiring coded or non-coded data, information, or images of any kind.

DETAILED DESCRIPTION

Figure 1A:
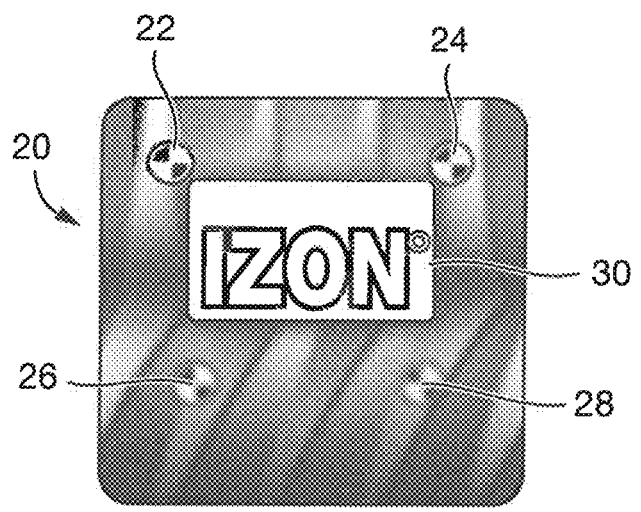
FIG. 1a is a plan view image of a full parallax hologram.

Unless otherwise stated or defined, all technical and scientific terms used herein have commonly understood meanings by one of ordinary skill in the art to which this disclosure pertains.

When the term "about" is used in describing a value or an end-point of a range, the disclosure should be understood to include the specific value or end-point referred to.

As used herein, the term "substantially" means being of considerable degree, almost all. If tolerance for comparing stored and observed values are "substantially" the same or equal, then those observed values fall within the stored range with any tolerance values included.

References in the singular may also include the plural (for example, "a" and "an" may refer to one, or one or more) unless the context specifically states otherwise.

Unless otherwise indicated, the terms set forth below have the intended meanings assigned to them.

"Digital" in addition to its ordinary meanings, is intended to encompass any digital media capable of simulating real parallax upon viewing, including computer modeling and digital stereography.

"Hologram" is intended to substantially mean a two-dimensional object, such as a label with an image in which the image has a reproduced viewing range that provides perception of depth and in detail of the image beyond what is typically viewed in a two-dimensional image. Holograms are typically fixed in a three-dimensional holographic film. Holograms include light interference patterns.

"Holographic" is intended to encompass any medium capable of generating an image that appears to be three-dimensional including media having real parallax upon viewing, such as optical volume holograms, and media that can simulate parallax on viewing, such as embossed holograms. By way of illustration and not limitation, photoimageable film is holographic.

"Optical" in addition to its commonly understood meanings, may also encompass any medium using optical elements, lenses, mirrors, and diffraction elements, capable of generating an image that appears to be three-dimensional or multi-channel upon viewing, such as lenticular images and micro-lens images.

"Parallax" is an apparent change in the position of an object resulting from a change in position of an observer viewing the object. An image has parallax if the image changes realistically with a change in the relative position of the observer. In a holographic image, if several objects were present when the hologram was recorded, the image has parallax if the holographic reconstructed objects move relative to one another with a change in the relative position of the observer in the same manner that the original objects would have moved relative to each other with the change in the viewing perspective.

"Parallax image" is a three-dimensional image that changes realistically with a change in the relative position of the observer such as a holographic image, a lenticular image or a micro-lens image that exhibits parallax.

"Point cloud" is intended to encompass any set of data points in a three-dimensional coordinate system, typically defined by x, y, and z axes, whether the data points corresponding to an element's coordinates are fixed or flexible. The point cloud data and the rigid body data will match in an authentic hologram or holographic element either exactly or within pre-determined tolerance limits.

"Print" in addition to its ordinary meanings encompasses any printed media capable of generating an image that appears to be three-dimensional or multi-channel upon viewing, and may include color shift inks.

"Rigid body" encompasses any idealization of a solid body, typically represented as a collection of point elements. This definition is meant to include both perfectly rigid bodies in which deformation can be neglected, as well as semi-flexible bodies in which deformations are reasonably known or expected and are predictable. An example of a rigid body as that term is used in this disclosure is a holographic element containing three identifiers in a triangular shape. The triangle defined by these three points is a rigid body.

"Two pairs" is understood to mean both two mutually exclusive pairs comprising four identifiers in total, as well as two pairs in which a single point is redundant in both pairs, comprising three identifiers in total.

In one embodiment, there is provided a holographic element comprising a reconstructable vector-based perspective element comprising at least two identifiers optically fixed in space within an imageable holographic film at varying depths so that they are not in the same plane, the film including a parallax image. The at least two identifiers out of plane with each other and the parallax image comprise a rigid body and a point cloud in a master scene in the hologram.

In an embodiment, the holographic element comprises at least two pairs of identifiers all of which are out of plane with each other. In another embodiment, the holographic element comprises an identifier in a reference plane and a multiplicity of identifiers which are out of plane with each other and the identifier in the reference plane. In a particular embodiment, the holographic element comprises an identifier in a reference plane and three identifiers fixed at varied depths so as to be out of plane with each other and out of plane with the identifier in the reference plane.

In an embodiment, the image exhibiting parallax is a lenticular image or a micro-lens image with at least two pairs of identifiers all of which are out of plane with each other.

In an embodiment, a holographic element also comprises data embedded in the holographic film which is readable by an optical instrument such as a scanner. The data may be letters, figures, diagrams, schematics or images, or may be coded as in a bar code, QR code or the like, and any combination of these. Data, such as site of manufacture, point of sale, warranty registration, identification of end user, inventory control data, internet links, and other useful or desirable information or data may be embedded in a hologram and made accessible during the authentication process or at any time.

The disclosed embodiments further include a validation device that may be any device for adjudicating an image exhibiting parallax. The validation device may communicate with, be coupled to, or include a scanning component such as a scanner, including a smart phone camera, a personal computer, a portable computer, a personal digital assistant, a printer, a copier, a portable scanner, a facsimile (fax) device, a multi-function device (MFD), a vending machine, a change machine, a currency reader/exchanger, an airport/train kiosk, a ticket reading device, a checkpoint reader, or other devices that may read documents or items with images exhibiting parallax. The validation device may output its validation determination to a user interface such as a display, printer, speaker, visual indicator for receipt by those attempting to authenticate an image exhibiting parallax. The validation device may reject the document or item containing the image if the image is adjudicated invalid. The validation device may be programed to notify the checker and/or other proper authorities either locally or remotely that a counterfeit has been detected.

In an embodiment, a hologram with parallax is illuminated with fixed point light source to generate a reconstructed image that is scanned and recorded. The viewing angle and direction (perspective) for the scan are determined. The determined perspective (angle and direction) is matched with a captured (stored) digital reference for the determined perspective. The relative vectors, whether visually apparent or simulated, extending between at least two pairs of target identifiers in the reconstructed image are determined and their relative length ratio(s) is compared against the ratio(s) of the same vectors in a stored digital reference taken from the same perspective. If the ratio(s) in the scanned image match the ratio(s) of the stored reference exactly or within programmed tolerance values in an algorithm, the hologram (and the item or document with which it is associated) is deemed to be authentic. If the image matching fails, the hologram and the item or document with which it is associated is deemed suspect. The tolerance applied is dependent on the level of security desired for the authentication.

In another embodiment, a hologram with parallax is illuminated with fixed point light source to generate a reconstructed image that is scanned and recorded. At least three relative vectors, whether visually apparent or simulated, extending between at least two pairs of target identifiers in the reconstructed image are determined and their relative length ratios are determined and then compared against all of the relative length ratios of the same three vectors of a stored digital reference for all possible perspective images for the valid hologram. If the ratios in the scanned image match one of those of the stored reference exactly or within programmed tolerance values in an algorithm, the hologram (and the item or document with which it is associated) is deemed to be authentic. If a greater degree of certainty is needed, it may be required that the process be repeated for multiple images.

In an embodiment, a method for validating a secondary hologram having parallax includes:

Creating a master image exhibiting parallax and containing at least two pairs of identifiers, at least two of which identifiers are located on differing depth planes;

Capturing still images of the master image from numerous viewing angles and directions (perspectives);

Recording the coordinates of the location from which each image is captured relative to the master image;

Identifying the at least two pairs of target identifiers in each of the captured images;

Generating vectors linking the target identifiers of each of the at least two pairs of target identifiers in each captured image;

Determining the vector lengths of the generated vectors and the ratio of the lengths of the vectors linking the target identifiers of each of the pairs of target identifiers;

Recording the vector length ratio for each image along with the corresponding image coordinates for each image;

Interpolating a vector length ratio, and optionally target identifier locations and linking vector lengths, for other possible perspectives for which images were not precisely captured;

Generating a digital model such as a computer database or a mathematical model capable of determining the one or more relative vector length ratios of the vectors linking the target identifiers of each of the at least two pairs of target identifiers, and optionally, target identifier locations and linking vector lengths, for a complete set of possible master image viewing perspectives;

Making a second image exhibiting parallax by duplicating the master image exhibiting parallax;

Illuminating the second image with a point light source and capturing a still image, from an arbitrary perspective, of the illuminated secondary image;

Identifying the at least two pairs of target identifiers in the captured image of the second image exhibiting parallax;

Creating vectors linking the target identifiers of each of the at least two pairs of target identifiers in the captured image of the second image exhibiting parallax, and determining the vector lengths and the ratio of the lengths of the vectors linking the target identifiers of each pair of target identifiers;

Comparing the vector length ratio against the corresponding vector length ratio from the master hologram digital model;

Determining whether the second image exhibiting parallax is valid and authentic based on whether the difference between the vector length ratio from the captured image of the second image exhibiting parallax and the vector length ratio from the digital model generated from the master hologram are within an acceptable predetermined margin;

Communicating the authentication determination to an evaluator of the secondary hologram.

The various steps of this method for validating a secondary hologram can be combined with other steps in practice, and the order of the steps can change without departing from the disclosed embodiments.

In one embodiment, the coordinates of the view point location of the captured still image of the secondary hologram and/or the perspective of the image relative to the secondary hologram is determined. The vector length ratio determined from the image of the secondary hologram is then compared only against the vector length ratio for the same viewing perspective (i.e., angle and direction) from a master hologram computer digital model. If the specific view location of the captured still image is determined, the vector length ratio and vector lengths can be compared against the corresponding data from the digital model for the same set of coordinates (i.e., viewing point).

The image exhibiting parallax and containing at least two pairs of target identifiers, at least two of which are located on differing depth planes, is preferably a hologram exhibiting full three-dimensional parallax in all directions. By "full three-dimensional parallax", it is meant that the holographic image changes realistically with a change in the relative position of the observer. The target identifiers in the holographic reconstructed object image move relative to one another in the same manner that the original objects would have done. By "all directions", it is meant that the realistic parallax is observable as the perspective shifts along both the x-axis and the y-axis. This is typically described in the art as having both horizontal (x-axis) and vertical (y-axis) parallax. The master hologram may be a volume hologram in which target identifiers within the parallax image are optically fixed in space and are located at multiple plane depths. Production of full parallax holograms may utilize various recording media (silver halide, dichromated gelatin, photopolymer, etc.) and such methods are well known and documented in the existing art. Alternatively, the hologram used in the disclosed embodiment can be a hologram that exhibits parallax in a single direction such as a rainbow hologram or a foil hologram. However, using a hologram that exhibits parallax in a single direction in the disclosed authentication method or with the disclosed digitally executable authentication program is less exacting than applying the disclosed authentication method or the disclosed digitally executable authentication program to a hologram that exhibits full parallax.

Of the target identifiers of the at least two pairs of target identifiers in the image exhibiting parallax, at least two of them are located on differing depth planes. The differing depth planes are indicative of target identifiers located at differing distances along the Z-axis. The target identifiers may be any uniquely identifiable design element including but not limited to linear junctions, identifiable shapes, or differences in contrast or color. For example, in the images of the full parallax hologram shown in FIG. 1a, the target identifiers are bow tie patterns 22, 24, 26 and 28 in the hologram 20. In the full parallax hologram shown in FIG. 2a, the target identifiers may be the points or nodes where lines in the pattern change direction.

Figure 1B:
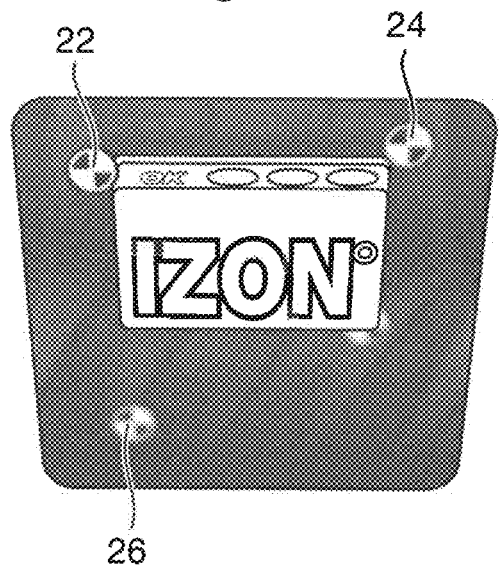
FIG. 1b shows an image of the hologram of FIG. 1a viewed from another perspective.
Figure 1C:
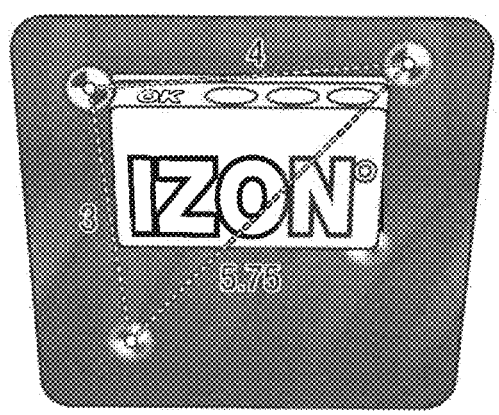
FIG. 1c show the hologram as shown in FIG. 1b with designated target identifiers and directional vectors connecting the target identifiers.

In a hologram exhibiting full parallax, the relative location of the target identifiers appear to change in a predictive manner as the perspective of the viewer shifts. In the hologram of FIG. 1a, the bow tie 24 appears to be on the same plane as the logo 30, where the bow tie 22 appears to be forward of the plane of the logo 30, and the bow ties 26 and 28 appear to be at different depths behind the plane of the logo 30. When the hologram is viewed from a different perspective, the relative lengths of the vectors between any three of the target identifiers change. For example, when the hologram of FIG. 1a is viewed from a different viewing angle and direction as shown in FIG. 1b, the apparent position of the target identifiers in a two-dimensional image of the hologram changes because of the parallax of the hologram. The hologram shown in FIG. 1c is viewed from the same perspective as shown in FIG. 1b and vectors between the bow tie target identifiers 22, 24 and 26 are shown. The lengths of these vectors and the ratio(s) of their lengths change in a predictable manner due to the full parallax of the hologram.

Once the master hologram has been created, still images of the master hologram are captured from numerous viewing angles and directions (i.e., viewing perspectives). Optionally still images of the master hologram can be generated at various distances from the hologram for each viewing perspective (i.e., viewing points). The viewing perspectives imaged cover a full range of viewing angles and directions from which the secondary hologram is likely to be observed during an authentication procedure. To capture the images of the master hologram from a full range of perspectives, the master hologram is mounted into a viewing station equipped with a scanning device such as a camera or other video recorder. A viewing station is used to properly quantify and mark in space the coordinates of the original view perspective, and optional view point, of each image relative to the hologram. Perspectives can be described in angular coordinates or polar coordinates relative to the surface normal angle. "Surface normal" refers to a viewing angle that is directly perpendicular to the holographic surface at the center point of the hologram. At the surface normal the viewing perspective is said to be 0,0 and has no angular tilt in either direction. Subsequent shifts along the x-axis or y-axis would then be described by the resulting positive or negative angular rotation relative to the surface normal. Still images of the master hologram are captured from many known viewing perspectives. The view perspective relative to the surface normal of the hologram typically ranges from about −35 degrees to about +35 degrees in both axes, but can change depending on the intended angle of view characteristic of the specific master hologram. During the recording process, it does not matter whether the camera remains fixed and the hologram tilts to affect an angular perspective shift, or whether the hologram remains fixed and the camera pivots around the hologram so long as the camera remains pointed in the direction of the hologram with an appropriate illumination source. While a viewing distance between 6 and 36 inches (15.2 and 91.4 cm) is typical, the distance of the camera from the hologram is mostly irrelevant as the vector length ratios for target identifiers remains constant at varying distance. Increased viewing distance is limited mainly by camera resolution.

The captured images are digitally stored in a computer database along with the x, y (and optionally z) coordinates or the polar coordinates for each image. The number of images captured depends on the desired precision, but for a typical authentication process, at least about 1000 to 5000 images are recorded from a complete range of perspectives for use in the disclosed authentication process. Fewer captured images may require greater interpolation of intermediate identifier locations from surrounding images. Either a single master hologram typically known in the art as an H1, or an exact copy of the master hologram, typically known as an H2, may be used in the generation of the images, although holographic quality loss is expected with each subsequent copy generation.

At least two pairs of target identifiers are identified in each of the captured images. The identified target identifiers are in at least two depth planes in the hologram. The same target identifiers are identified and plotted in each image. This can be done manually, but it is preferably done by a scanning computer program that identifies the target identifiers in each of the digitally stored images. The scanning program may use feature recognition technology such as marker recognition or markerless recognition as used in the augmented reality (AR) and computer generated imagery (CGI) fields.

Figure 2A:
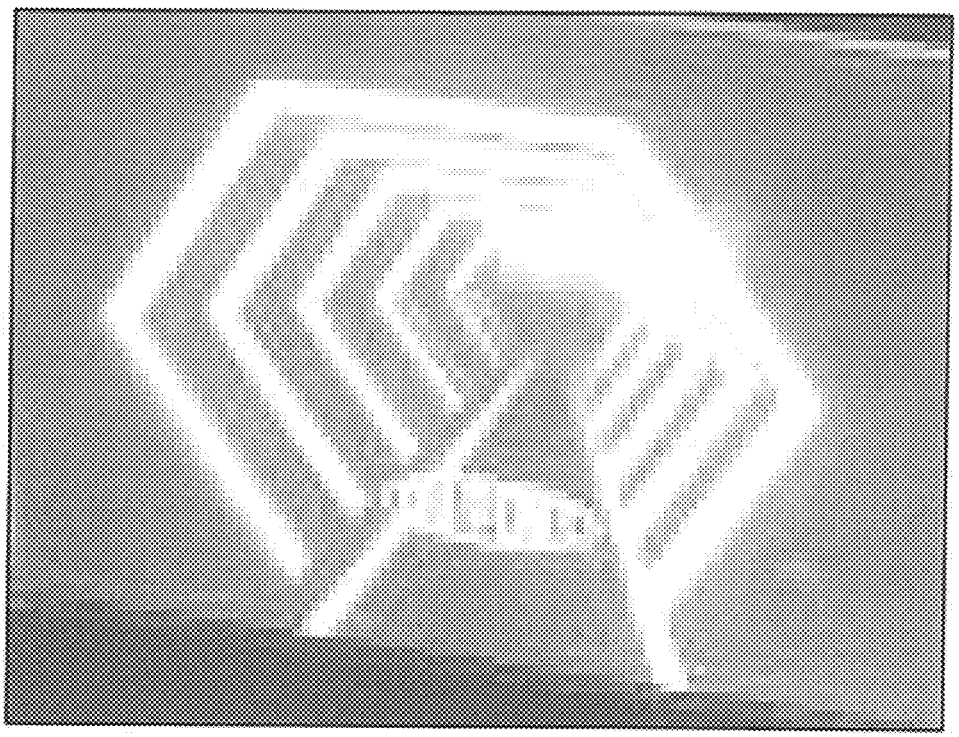
FIG. 2a is a captured image of a full parallax hologram.
Figure 2B:
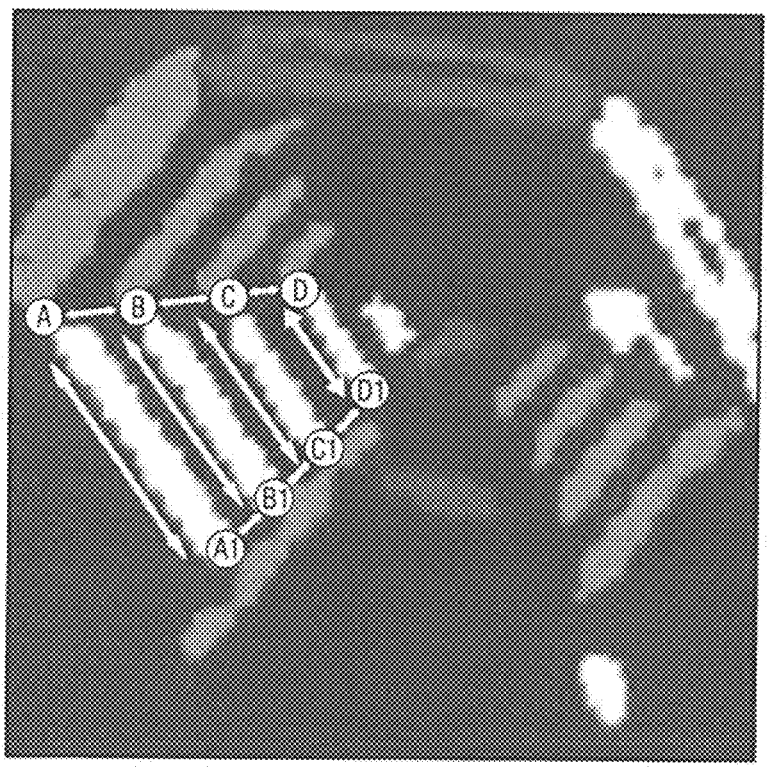
FIG. 2b shows identification and digital measurement of indiscrete identifiers of the image in FIG. 2a with designated target identifiers and directional vectors connecting the target identifiers.

For example, for the hologram shown in FIG. 2a, the scanning computer program first crops the images to capture only the hologram in each image, and it then converts the image to greyscale. With the hologram shown in FIG. 2a, the scanning program identifies the nodes where the lines of the hologram change direction as the target identifiers, and vectors linking the target identifiers A, B, C, D, A1, B1, C1, and D1 are generated as shown in FIG. 2b, where the vectors are identified by the lines extending between the target identifier nodes. The scanning program records the x-y coordinates of each of the target identifiers/nodes and calculates the length of each of these linking vectors. The scanning program calculates the vector lengths and the comparative lengths of at least three of the vectors linking the target identifiers in each image taken from each view perspective. The vector length ratios are useful because they remain constant for a given view perspective (viewing angle and direction) regardless of the distance from the hologram at which the image was captured.

The vectors between three target identifiers form what is known as a rigid body. The apparent length of the vectors of the rigid body change with the perspective from which the rigid body in the image exhibiting parallax is viewed. Vectors linking at least two pairs of target identifier nodes create a polygon. A single master image might have multiple polygons depending on the number of target identifiers and the desired precision. In the case of a three-sided polygon, the vector length ratios are called a "triple" as there are three resulting vector length values. These triples are described by a ratio rather than absolute length in any given unit. A triangle with vector lengths measured in pixels might be 25 px; 50 px; 30 px which has the same ratio as a triangle measured as 50 px; 100 px, 60 px.

Because the hologram is one exhibiting full parallax, the ratios of vector lengths change in a predictable manner with the view perspective (viewing angle and direction). This predictable change with viewing angle and direction makes it possible for the processor running the scanning computer program to next interpolate the vector length ratios for viewing angles and viewing directions from which images were not actually captured. Even though there isn't a captured image corresponding to each minute change in viewing angle and direction, these vector length ratio values can be accurately interpolated from data recorded from the scanned images. For example, if a horizontal (x-axis) polar perspective shift of +3 degrees from the surface normal resulted in a given vector increasing from 5 units to 7 units, that vector length might be interpolated at 6 units for an assumed +1.5 degrees shift from normal along the same axis at equivalent distance. From the recorded images, a digital model such as a computer database or mathematical model is generated from which the relative vector length ratios can be measured and/or interpolated for a complete set of possible hologram viewing angles and directions regardless of distance from the hologram.

The authentication process also requires that the secondary hologram duplicates be generated from the master hologram or from a very high quality duplicate of the master hologram. By definition, the secondary holograms exhibit the same parallax as the master hologram. The processes for producing hologram duplicates are well established and known to those skilled in the art.

The secondary hologram duplicates are affixed to or incorporated into products, documents or items that may require authentication. For example, the secondary hologram duplicates can be associated with medicines, clothing and accessories, electronic devices, currency, passports and other government or non-governmental ID cards (academic, corporate), tickets, key cards, documents, and other items where authentication, brand protection, or anti-counterfeiting is necessary or desirable.

When it is desired to check the authenticity of a secondary hologram, and consequently the item with which the secondary hologram is affixed or into which the secondary hologram is incorporated, the checker and/or checking device locates the secondary hologram. The checking device illuminates the secondary hologram with a point light source and a reconstruction of the hologram is generated and is captured by a camera, scanner, or other digital recorder of the checking device from an arbitrary viewing perspective. Where greater authentication accuracy is desired, multiple images may be captured. In one embodiment, the scanning device is a smart phone or tablet computer equipped with a still or video camera and a flash emitter or other light source. In another embodiment, the scanner is a portable digital scanning device that includes a digital scanner or camera and a point light source. In another embodiment, the scanner is a digital camera mounted in a portable or table top device in conjunction with a point light source fixed at a known position relative to the scanner and connected to a computer to provide a rapid authentication response. The checking device may include a computer program or application that controls the camera and light source when the image of the secondary hologram is captured and that stores the captured image. The program or application may be one that is downloaded onto the checking device as a computer program or "app" from a website such as an App Store.

The master hologram and/or the secondary hologram copies of the master hologram may contain other useful data detectable by a scanning device. Additional data may be fixed in the hologram as information, graphics, symbols, or schematics embedded in the holographic film. Codes (bar, QR, for example) can be used for automatic registrations for warranty, subscription, rebate, discount and other such purposes. Embedded codes or data can also be used for remote purchase verification such as for internet sales. The code may, for example, identify the hologram being authenticated or the internet address of a remote authentication processor so that when the scanned information is sent to the authentication processor, the scanned image will be compared against the data or digital model of the correct hologram. Of particular interest in relation to the field of authentication are track-and-trace information that can be provided by a scanning device such as: point of sale, location of the product at any given time, demographic information about the buyer, the buyer's identity, contact information for the buyer, or whether the packaging or container for the product is being repurposed or recycled. Alerts for product upgrades and add-ons can be launched on the scanning device for the customer's information. These can help the supplier of the product in profiling target markets of potential interest. Assembly and use instructions, as well as demonstration or instructional videos, may auto-launch on the scanning device from codes or internet links embedded in the hologram.

In one embodiment, the scanning program records and saves the image and then electronically transmits the image to a remote processor computer that performs the functions of cropping the image, identifying the at least two pairs of target identifiers in the captured image, generating vectors between the identified target identifiers, measuring the lengths of the vectors and calculating the vector length ratios for the rigid body formed by the target identifiers, comparing the calculated vector length ratios with the ratios stored in the computer database generated from the master hologram or calculated from the digital model based on the master hologram, determining whether the difference between the ratios measured from the secondary hologram and the ratios from the master hologram computer database or digital model are below that required for the secondary hologram to be adjudicated authentic, and communicating the authentication adjudication back to a device proximate the authenticator or checking device, such as the authenticator's smart phone or a device associated with the checking device.

In one embodiment the method of authentication compares vector length ratios of captured images of the reconstructed secondary hologram against the database of captured images of the master hologram from a known perspective. The scanning program calculates the perspective and/or view point from which the image was captured relative to the secondary hologram. The scanning program then compares the vector length ratios in the scanned image against the vector length ratios for the corresponding perspective determined from the database or digital model generated from the master hologram. The viewing perspective of the image of the secondary hologram may be determined through visual odometry techniques utilizing information proximate to or embedded in the hologram. For example, the hologram might be placed within a printed square bounding box of known proportion. The apparent shape and proportions of this bounding box may be utilized to indicate the angle and direction (perspective) of the scanner as these qualities change in a predictable manner as the scanner angle and direction varies from the surface normal. The locations of target identifiers in the secondary hologram may be compared against a digital simulation model (for example, point cloud model) of the corresponding rigid bodies derived from the master hologram.

In another embodiment, the perspective of the scanner and scanned image is not known or determined. Instead, the scanner captures multiple images of the secondary hologram, locates target identifiers in each image, constructs three-sided polygons (triples), determines the vector length ratio of the triples, and verifies that the vector length ratio of each triple exists within an exhaustive master database, comprised of triples from images taken from a full range of perspectives. Each additional verifiable triple obtained from an image of a secondary hologram adds an increased level of certainty of the authentication.

The process for identifying the at least two pairs of target identifiers in the captured image of the secondary hologram, creating vectors linking the target identifiers in the captured image of the secondary hologram, and determining the vector lengths and the comparative ratio(s) of the lengths of the vectors linking the target identifiers of the secondary hologram is the same process as described above for determining the vector length ratio(s) from the master hologram.

In one embodiment, the scanning program is located proximate where the secondary hologram is scanned and the scanning program performs the steps of cropping the image, identifying the target identifiers in the captured image, generating vectors between the identified target identifiers, measuring the lengths of the vectors and calculating the vector length ratio(s) for the rigid body formed by the target identifiers. Optionally, the scanning program located proximate the scanner also calculates the perspective and/or view point from which the image was captured relative to the secondary hologram. The scanning device or a computer connected to the scanning device then transmits the vector length ratio(s), and optionally the data identifying the view perspective or view point for the image, to a remote computer that performs the steps of comparing the vector length ratio(s) with the ratio(s) stored in a computer database generated from the master hologram or calculated from the digital model derived from the master hologram, determining whether the difference between the vector length ratio(s) measured from the secondary hologram and the vector length ratio(s) from the master hologram computer database or digital model are below that required for the secondary hologram to be judged authentic, and communicating the authentication adjudication back to a device proximate the scanning device and/or the authenticator.

In another embodiment, the scanning program located proximate where the secondary hologram is scanned performs the steps of cropping the image, identifying the target identifiers in the in the captured image, generating vectors between the identified target identifiers, measuring the lengths of the vectors and calculating the vector length ratio(s) for the rigid body formed by the target identifiers, comparing the vector length ratio(s) with the ratio(s) stored in a computer database generated from the master hologram or calculated from the digital model made from the master hologram that is stored on and executable from the scanning device or a computer proximate the scanning device, determining whether the difference between the ratio(s) measured from the secondary hologram and the ratio(s) from the master hologram computer database or digital model are below that required for the secondary hologram to be adjudicated authentic, and communicating the authentication adjudication to the checker. Optionally, the scanning program may calculate the perspective and/or view point from which the image was captured relative to the secondary hologram and then compare the vector length ratio for only that perspective against the vector length ratio for the corresponding perspective in the computer database or digital model located proximate where the secondary hologram is scanned. In another embodiment, the scanning program compares the vector length ratio against the vector length ratios for all perspectives in the database or digital model looking for any positive match.

In another embodiment, the scanning program located proximate where the secondary hologram is scanned performs the steps of capturing the images of the secondary hologram. The scanning device or a computer connected to the scanning device then transmits the images to a remote computer that performs all the tasks of identifying the target identifiers in the captured image, generating vectors between the identified target identifiers, measuring the lengths of the vectors and calculating the vector length ratio(s) for the rigid body formed by the target identifiers, comparing the vector length ratio(s) with the ratio(s) stored in a computer database generated from the master hologram or calculated from the digital model made from the master hologram, determining whether the difference between the vector length ratio(s) measured from the secondary hologram and the vector length ratio(s) from the master hologram computer database or digital model are below that required for the secondary hologram to be judged authentic, and communicating the authentication adjudication back to a location of the scanning device and/or the authenticator or another computer processor. Optionally, the remote computer may calculate the perspective and/or view point from which the image was captured relative to the secondary hologram and then compare the vector length ratio for only that perspective against the vector length ratio for the corresponding perspective in the computer database or digital model located with the remote computer. In another embodiment, the remote computer compares the vector length ratio against the vector length ratios for all perspectives in the database or digital model looking for any positive match.

The authentication can be based on a single image of the secondary hologram, but the authentication system described can be made more robust by requiring a positive match on multiple scanned images of the secondary hologram before the secondary hologram is found to be authentic.

In one possible embodiment, determination of authentication is provided directly to the evaluator via the in-app user interface on, for example, a mobile smartphone. This communication might be transmitted by an on-screen graphic, vibration, sound, or any combination. In other embodiments, the authentication determination can be communicated to an evaluator through various methods including, but not limited to, email, text message, SMS, phone call, facsimile, visual indicators on the scanning device, positive responses from a connected device such as a vending machine or electronic door latch, or other means of electronic communication.

Figure 3:
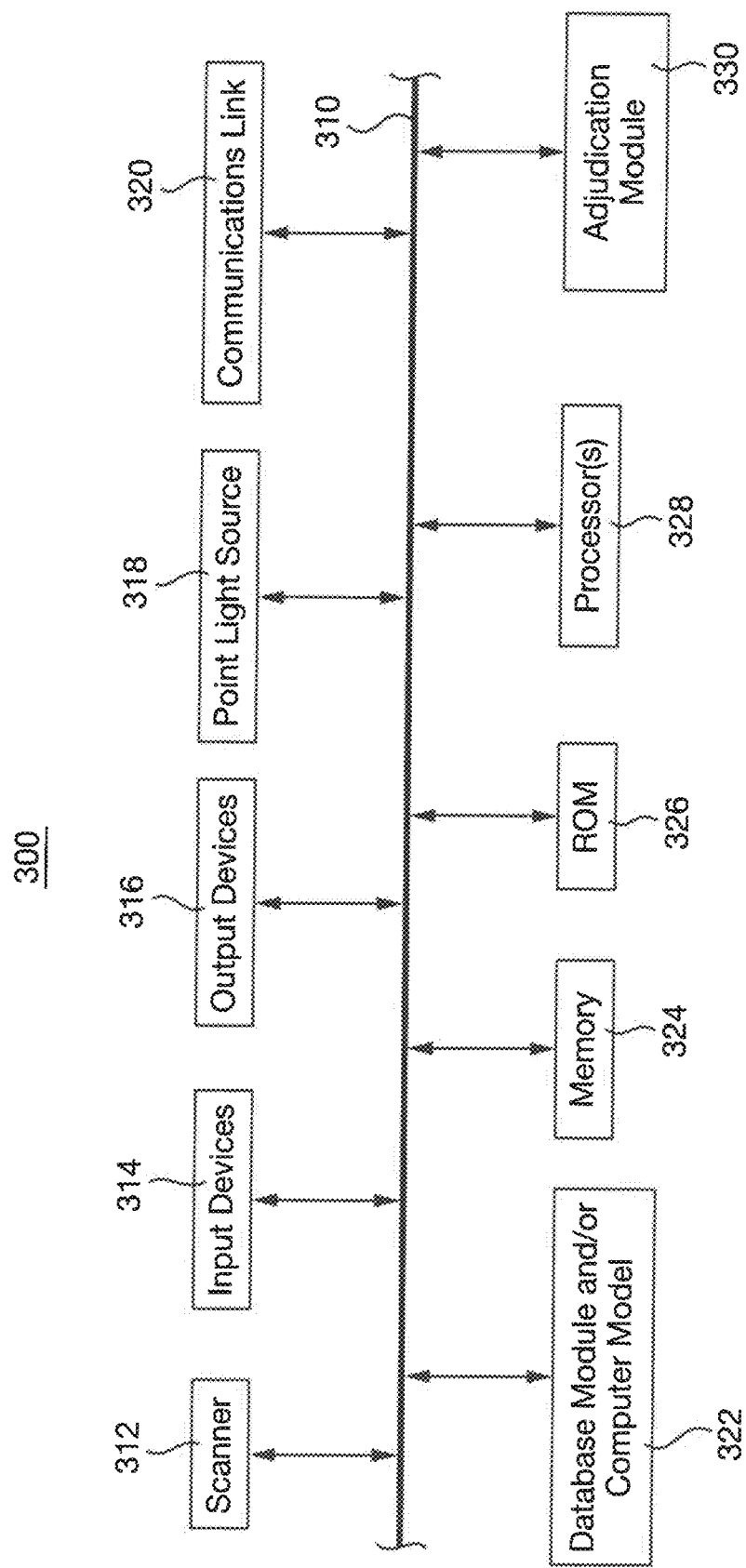
FIG. 3 is a block diagram of a hologram validation system according to a disclosed embodiment.

FIG. 3 illustrates a block diagram of a parallax image validation system in accordance with one possible embodiment of the disclosure. The parallax image validation system 300 may include, for example, communication interface 310, a scanner 312, input and/or output devices 314 and 316, a point light source 318, a communications link 320, a computer database module and/or a digital computer model 322, a memory 324, a read only memory (ROM) 326, one or more processors 328, and an adjudication module 330.

The communication interface 310 permits communication among the components of the parallax image validation system 300. Depending upon the location of the various components, the communication interface 310 may be a bus, a hard-wired connection, a wireless link, an optical connection, an audio connection, or any combination thereof. The communication interface 310 interconnects the other components of the system and allows the components to digitally communicate with each other. The communication interface may, for example, include a computer network, an ethernet connection, a cellular network connection, a wireless internet connection, an internet connection, or a combination thereof. Communication interface 310 may include any mechanism that facilitates communication via a network. The communication link 320 may include other mechanisms for assisting in communications with other devices and/or systems.

In an embodiment, the scanner 312 is an optical scanner such as a digital camera or recorder. Other possible scanning devices include a smart phone camera, printer, a copier, a document scanner, a multi-function printing and scanning device, a facsimile (fax) device, a personal computer, a portable computer, a notebook computer, a personal digital assistant, a tablet computer, a handheld scanner, a vending machine reader, a change machine reader, a currency reader/exchanger, an airport/train kiosk device, a ticket reading device, a gate or checkpoint reader, or other devices that may read documents or items with holograms. A smart phone camera is a preferred scanning device because much of the population already owns smart phones with cameras and light sources.

Input device 314 may include one or more conventional mechanisms that permit a user to input information to the processing device, such as a keyboard, a touch screen or touch pad, a mouse, a digital pen, a voice recognition device, or a keypad. One or more than one input device may be incorporated into the validation system 300. Output device 316 may include one or more conventional mechanisms that output information to a user, including a display, a printer, a copier, a scanner, a multi-function device, one or more speakers, a display light or diode, or a medium, such as a memory, or a magnetic or optical disk and a corresponding disk drive.

The point light source 318 may be a light bulb, a camera flash, a light or flash on a smart phone such as an LED light, sunlight, or another source of light. Preferably, the light source is a light or flash on the scanning device that is controlled by the scanning device.

Processor 328 may include at least one conventional processor or microprocessor that interprets and executes instructions. Memory 324 may be a random-access memory (RAM) or another type of dynamic storage device that stores information and instructions for execution by processor or processors 328. Read-only memory (ROM) 326 may also be included in the validation system 300 which may include a conventional ROM device or another type of static storage device that stores static information and instructions for processor 328. A storage device may augment the ROM and may include any type of storage media, such as, for example, a thumb drive, a hard drive, cloud drive, magnetic or optical recording media and its corresponding drive. The parallax image validation system 300 may perform such functions in response to processor 328 by executing sequences of instructions contained in a computer-readable medium, such as, for example, memory 324 and ROM 326. Such instructions may be read into memory 324 from another computer-readable medium, such as a storage device or from a separate device via the communication link 320, which for example could be a hard-wired connection, a wireless connection or an optical connection.

The parallax image validation system of FIG. 3 and the related discussion are intended to provide a brief, general description of a suitable communication and processing environment in which the authentication/validation system may be implemented. Although not required, the disclosed embodiments are described, at least in part, in the general context of computer-executable instructions, such as the system components shown in FIG. 3.

Generally, program modules include routine programs, objects, components, data structures, etc. that perform particular tasks or implement particular abstract data types. Moreover, those skilled in the art will appreciate that other embodiments may be practiced in communication network environments with many types of communication equipment and computer system configurations, including smart phones, tablet computers, personal computers, hand-held devices, multi-processor systems, microprocessor-based computers, programmable consumer electronics, and the like. Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described therein.

It will be appreciated that variations of the above-disclosed embodiments and other features and functions, or alternatives thereof, may be desirably combined into many other different systems or applications. It is also understood that various presently unforeseen or unanticipated alternatives, modifications, variations or improvements therein may be subsequently made by those skilled in the art which are also intended to be encompassed by the following claims.

The concepts described herein will be further illustrated in the following example, which does not limit the scope of the invention described in the claims.

EXAMPLE

A master hologram (Hologram A) was produced by volume reflection holography using a glass plate coated with dichromated gelatin (DCG). Hologram A comprises three individual bow-tie targets resembling those depicted in FIG. 1. Hologram A exhibits full three-dimensional parallax. The first target was located at a depth plane coincident with the surface of the DCG emulsion; a condition commonly known in the art as being located on the film plane. A second bow-tie target was located on a parallel depth plane approximately 3 mm behind the film plane and the third target was located on a parallel depth plane approximately 2 mm in front of the film plane. This master hologram is designated as the "authentic master" version to be used in master database creation.

Hologram A was placed in a viewing station and illuminated with a point light source in the form of a single white LED emitter located proximate a digital camera. The viewing station provided a mechanism whereby the camera could be positioned at various quantifiable perspectives within the intended angle of view of the hologram while remaining focused on the hologram and keeping the hologram centered in its field of view. A multiplicity of still images of Hologram A were captured and stored in a database. Each still image represented an individual polar coordinate relative to the surface normal designated as perspective (0,0). Still images were captured in successive one degree increments to the extent of reaching ±35 degrees in both the horizontal and vertical axes, and each image file was labelled with the appropriate perspective coordinate (e.g. −12,+6 corresponding to a perspective location that is minus 12° from normal in the horizontal axis, and +6° from normal in the vertical axis).

The master file was retrieved from the database corresponding to the perspective coordinates of another hologram that is to be compared to the master Hologram A. Master database images were cropped to include only the target identifiers and the cropped images were zoomed to aid in precision. In analyzing the master image of Hologram A from the perspective angle located at +15° in the y-axis and +5° in the x-axis, a node was placed at the center of the bow-tie targets located at the junction point of the intersecting lines of each target. This node placement was performed manually with the aid of 2D CAD software. Alternatively the node placement could be performed digitally using common feature recognition techniques. Vectors were drawn between each pair of nodes creating a 3-sided polygon. Vector lengths were initially measured and measurements were converted to a ratio of relative lengths. A 3-sided polygon with vector lengths of 2.35 inch, 3.78 inch, and 1.93 inch resulted from the measurement process. The resulting ratio was therefore 1.00:1.61:0.82. This ratio remains constant regardless of the zoom extent of the cropped image.

A duplicate Hologram B was created by directly replicating Hologram A using a contact copy method used in reflection holography replication. The replication process resulted in Hologram B being an exact replica of Hologram A with identical depth planes. Hologram B was placed in the viewing station and corresponding perspective angle of +15° y-axis and +5° x-axis was chosen. A still image was captured using a digital camera with a point light source. The image was cropped to include only the bow-tie targets and the cropped image was zoomed to aid in precision. In analyzing the image of Hologram B, a node was placed at the center of each of the bow-tie targets located at the junction point of the intersecting lines of each target. This node placement was performed manually with the help of 2D CAD software. Alternatively the node placement could be performed digitally using common feature recognition techniques. Vectors were drawn between each pair of nodes creating a 3-sided polygon. Vector lengths were initially measured and measurements were converted to a ratio of relative lengths. A three-sided polygon with side lengths 2.58 inch, 4.16 inch, and 2.13 inch was the result of the measurement process, producing a triangle with side length ratio of 1.00:1.61:0.83 which is within the expected measurement error of the devices. The resulting ratio is deemed to be identical. Hologram B is deemed authentic.

A third hologram (Hologram C) was produced by volume reflection holography, using a glass plate coated with dichromated gelatin (DCG) comprised of three individual bow-tie targets resembling those depicted in FIG. 1. In this instance the first target was located at a depth plane coincident with the surface of the DCG emulsion. A second bow-tie target was located on a parallel depth plane approximately 2.5 mm behind the film plane and the third target was located on a parallel depth plane approximately 1.5 mm in front of the film plane. Hologram C was an attempted counterfeit of the master Hologram A and the two holograms appeared identical to the common unaided viewer.

Hologram C was placed in the viewing station and a still image was captured from the perspective angle corresponding to +15° y-axis and +5° x-axis using a point light source. The image was cropped to include only the targets and the cropped image was zoomed to aid in precision. In analyzing the image of Hologram C, a node was placed at the center of the bow-tie targets located at the junction point of the intersecting lines of each target. This node placement was performed manually with the assistance of 2D CAD software.

Alternatively the node placement could be performed digitally using common feature recognition techniques. Vectors were drawn between each pair of nodes creating a 3-sided polygon. The resulting vector lengths were 2.60 inch, 3.78 inch, and 2.01 inch. The resulting side length ratio was therefore 1.00:1.45:0.77. Because the vector ratio from Hologram B did not precisely match the ratio for the corresponding master database image of Hologram A and was outside the error explainable by simple measurement error, Hologram C was deemed to be not authentic.

Further exemplary embodiments of the present disclosure are set out in the following numbered clauses:

Numbered clause 1: A method for determining the validity of a parallax image, comprising:
- receiving a captured two-dimensional image of a parallax image having at least three target identifiers located at different depths in the full parallax image;
- identifying the at least three target identifiers in the captured two-dimensional image of the parallax image and determining the spatial relationship between the at least three target identifiers in the two-dimensional image of the parallax image;
- comparing the spatial relationship of the three target identifiers in the captured two-dimensional image of the parallax image against a digital model of the spatial relationship between the at least three target identifiers of the parallax image; and
- adjudicating the authenticity of the parallax image based on the degree of difference between the spatial relationship of the at least three target identifiers in the captured two-dimensional image of the parallax image and the digital model of the spatial relationship between the at three target identifiers of the parallax image.

Numbered clause 2: The method of clause 1 wherein the parallax image is an image generated from a hologram which parallax image exhibits full parallax.

Numbered clause 3: A method for determining the validity of a parallax image, comprising:
- capturing multiple two-dimensional images of the parallax image taken from multiple perspectives; identifying at least two pairs of target identifiers in each captured two-dimensional image of the parallax image; creating a plurality of vectors linking the target identifiers in each of the captured two-dimensional images of the parallax image; determining the ratio of the lengths of the vectors linking the target identifiers in each of the captured two-dimensional images of the parallax image; and generating a digital model for the parallax image that captures the ratio of the lengths of the vectors linking the target identifiers in each of the captured two-dimensional images of the parallax image;
- receiving a captured two-dimensional image of a possible duplicate of the parallax image; identifying at least two pairs of target identifiers in the captured two-dimensional image of the possible duplicate of the parallax image; creating a plurality of vectors linking the target identifiers in the captured two-dimensional image of the possible duplicate of the parallax image; and determining the ratio of the lengths of the vectors linking the target identifiers in the captured two-dimensional image of the possible duplicate of the parallax image;
- accessing the digital model for the parallax image; comparing the vector length ratio determined from the captured two-dimensional image of the possible duplicate of the parallax image against vector length ratio values captured in the digital model for the parallax image; calculating the difference between the vector length ratio for the captured two-dimensional image of the possible duplicate of the parallax image and the vector length ratios from the digital model for the parallax image; and adjudicating the authenticity of the captured two-dimensional image of the possible duplicate of the parallax image based on whether the difference between the vector length ratio from the captured two-dimensional image of the possible duplicate of the parallax image and the vector length ratio from the digital model for the parallax image are within an acceptable predetermined margin.

Numbered clause 4: The method of clause 3 wherein the parallax image is an image exhibiting parallax generated from a hologram.

Numbered clause 5: The method of clause 3 or clause 4 wherein the parallax image exhibits full parallax.

Numbered clause 6: The method of any of clauses 3 to 5 including the steps of:
- determining the perspective relative of the parallax image of each of the multiple two-dimensional images of the parallax image; and inputting the coordinates of the perspective of each two-dimensional image of the parallax image into the digital model for the parallax image and associating such perspective coordinates with the ratio of the lengths of the vectors linking the target identifiers in each of the respective two-dimensional images of the parallax image captured in the digital model for the parallax image;
- determining the perspective relative to the possible duplicate of the parallax image of the received captured two-dimensional image of the possible duplicate of the parallax image;
- comparing the vector length ratio determined from the captured two-dimensional image of the possible duplicate of the parallax image against vector ratio captured from the digital model for the parallax image for substantially the same perspective coordinates; calculating the difference between the vector length ratio for the captured two-dimensional image of the possible duplicate of the parallax image and the corresponding vector length ratio of the digital model for substantially the same perspective coordinates; and adjudicating the authenticity of the captured two-dimensional image of the possible duplicate of the parallax image based on whether the differences between the vector length ratio from the captured two-dimensional image of the possible duplicate of the parallax image and the vector length ratio values from the digital model for substantially the same perspective coordinates are within an acceptable predetermined margin.

Numbered clause 7: The method of any of clauses 3 to 6 comprising:
- receiving a plurality of captured two-dimensional images of a possible duplicate of the parallax image; identifying at least two pairs of target identifiers in each of the plurality of captured two-dimensional images of the possible duplicate of the parallax image; creating a plurality of vectors linking the target identifiers in each of the plurality of captured two-dimensional images of the possible duplicate of the parallax image; and determining the ratio of the lengths of the vectors linking the target identifiers in each of the plurality of captured two-dimensional images of the possible duplicate of the parallax image;
- accessing the digital model for the parallax image; comparing the vector length ratio determined from each of the plurality of captured two-dimensional images of the possible duplicate of the parallax image against vector length ratio values captured in the digital model for the parallax image; calculating the difference between the vector length ratio for each of the plurality of captured two-dimensional images of the possible duplicate of the parallax image and the vector length ratios from the digital model for the parallax image; and adjudicating the authenticity of the captured two-dimensional image of the possible duplicate of the parallax image based on whether the difference between the vector length ratio from each of the plurality of captured two-dimensional image of the possible duplicate of the parallax image and the vector length ratio from the digital model for the parallax image are within an acceptable predetermined margin.

Numbered clause 8: A digitally executable authentication system for determining the validly
of a parallax image that executes the steps comprising:
receiving multiple two-dimensional images of a master parallax image taken from multiple perspectives; identifying the same at least two pairs of target identifiers in each two-dimensional image of the master parallax image; creating a plurality of vectors linking the target identifiers in each of the two-dimensional images of the master parallax image; determining the ratio of the lengths of the vectors linking the target identifiers in each of the two-dimensional images of the master parallax image; and generating a digital model that captures the ratio of the lengths of the vectors linking the target identifiers in each of the two-dimensional images of the master parallax image;
  receiving a captured two-dimensional image of a possible duplicate of the master parallax image; identifying at least two pairs of target identifiers in the captured two-dimensional image of the possible duplicate of the master parallax image; creating a plurality of vectors linking the target identifiers in the captured two-dimensional image of the possible duplicate of the master parallax image; and determining the comparative ratio of the lengths of the vectors linking the target identifiers in the captured two-dimensional image of the possible duplicate of the master parallax image;
  accessing the digital model; comparing the vector length ratio determined from the captured two-dimensional image of the possible duplicate of the master parallax image against vector ratio values captured in the digital model; calculating the difference between the vector length ratios for the captured two-dimensional image of the possible duplicate of the master parallax image and the vector length ratios of the digital model; and adjudicating the authenticity of the captured two-dimensional image of the possible duplicate of the master parallax image based on whether the differences between the vector length ratio values from the captured two-dimensional image of the possible duplicate of the master parallax image and the vector length ratio values from the digital model are within an acceptable predetermined margin.

Numbered clause 9: The digitally executable authentication system for determining the validly of a parallax image of clause 8 wherein the parallax image is an image exhibiting parallax generated from a hologram.

Numbered clause 10: The digitally executable authentication system for determining the validly of a parallax image of clause 8 or 9 wherein the parallax image is an image exhibiting full parallax generated from a hologram.

Numbered clause 11: The digitally executable authentication system for determining the validly of a parallax image of any of clauses 8 to 10 that executes the steps of capturing the perspective relative of the master parallax image of each of the multiple two-dimensional images of the master parallax image; and inputting the respective coordinates of the perspective of each two-dimensional image of the master parallax image into the digital model and associating such perspective coordinates with the ratio of the lengths of the vectors linking the target identifiers in each of the respective two-dimensional images of the master parallax image;
  determining the perspective relative to the possible duplicate of the master parallax image of the received captured two-dimensional image of a possible duplicate of the master parallax image;
  comparing the vector length ratio determined from the captured two-dimensional image of the possible duplicate of the master parallax image against vector length ratio values captured in the digital model for substantially the same perspective coordinates; calculating the difference between the vector length ratio for the captured two-dimensional image of the possible duplicate of the master parallax image and the corresponding vector length ratio of the digital model for substantially the same perspective coordinates; and adjudicating the authenticity of the captured two-dimensional image of the possible duplicate of the master parallax image based on whether the difference between the vector length ratio values from the captured two-dimensional image of the possible duplicate of the master parallax image and the vector length ratio value from the digital model for substantially the same perspective coordinates are within an acceptable predetermined margin.

Numbered clause 12: The digitally executable authentication system for determining the validly of a parallax image of clause 11 that executes the steps of:
  receiving a plurality of captured two-dimensional images of a possible duplicate of the master parallax image; identifying at least two pairs of target identifiers in each of the plurality of captured two-dimensional images of the possible duplicate of the master parallax image; creating a plurality of vectors linking the target identifiers in each of the plurality of captured two-dimensional images of the possible duplicate of the master parallax image; and determining the comparative ratio of the lengths of the vectors linking the target identifiers in each of the plurality of captured two-dimensional images of the possible duplicate of the master parallax image; determining the perspective relative to the possible duplicate of the master parallax image of each of the plurality of received captured two-dimensional images of a possible duplicate of the master parallax image;
  comparing the vector length ratio determined from each of the plurality of captured two-dimensional images of the possible duplicate of the master parallax image against corresponding vector length ratio in the digital model for substantially the same perspective coordinates as each of the plurality of captured two-dimensional images of the possible duplicate of the master parallax image; calculating the difference between the vector length ratio for each of the plurality of captured two-dimensional images of the possible duplicate of the master parallax image and the corresponding vector length ratio of the digital model for substantially the same perspective coordinates; and adjudicating the authenticity of the captured two-dimensional image of the possible duplicate of the master parallax image based on whether the difference between the vector length ratio values from each of the plurality of captured two-dimensional images of the possible duplicate of the master parallax image and the corresponding vector length ratio values from the digital model for substantially the same perspective coordinates are within an acceptable predetermined margin.

Numbered clause 13: A method for validating a hologram having parallax comprising:
- creating a first hologram exhibiting parallax and containing at least three target identifiers, at least two of which are located on differing depth planes;
- capturing still images of the first hologram from multiple viewing perspectives;
- recording the coordinates of the viewing perspective from which each image is captured relative to the first hologram;
- identifying at least two pairs of target identifiers in each of the captured images of the first hologram;
- generating vectors linking the at least two pairs of target identifiers in each captured image of the first hologram;
- determining the relative vector length ratios of the generated vectors linking the target identifiers in each image of the first hologram;
- recording the vector length ratios for each image along with the coordinates of the viewing perspective for each image;
- using the recorded vector length ratios for each image along with the image coordinates to generate a first hologram digital model that determines the vector length ratio for a complete set of possible perspectives from which the first hologram is viewed;
- determining whether a second hologram exhibiting parallax is an authentic duplicate of the first hologram by
- illuminating the second hologram with a point light source and capturing an image of the illuminated second hologram;
- calculating the coordinates of the viewing perspectives of the captured image relative to the second hologram;
- identifying the at least two pairs of target identifiers that were identified in the first hologram in the captured image of the second hologram;
- creating vectors linking the target identifiers in the captured image of the second hologram, and determining the ratio of the lengths of the vectors linking the target identifiers in the second hologram;
- calculating the difference between the vector length ratio from the second hologram against the corresponding vector length ratio determined from the first hologram digital model for the perspective coordinates from which the image of the second hologram was captured;
- adjudicating the authenticity of the second hologram based on whether the difference between the vector length ratio from the captured image of the second hologram and the corresponding vector length ratio values from the first hologram digital model are within an acceptable predetermined margin;
- communicating the authentication determination to an evaluator of the second hologram.

Numbered clause 14: The method for validating a hologram having parallax of clause 13 wherein the capturing an image of the illuminated second hologram is done with a scanning device selected from cameras, scanners, and digital recorders.

Numbered clause 15: The method for validating a hologram having parallax of clause 14 wherein the scanning device is a smart phone equipped with a camera and a point light source.

What is claimed is:

1. A method for determining authenticity of a hologram, the method comprising:
    - receiving a plurality of images of the hologram captured from a respective plurality of arbitrary viewing perspectives; and
    - using the plurality of images of the hologram in combination with a digital model to determine whether the hologram is an authentic duplicate of a master hologram,
    - wherein the digital model is generated based on a plurality of images of the master hologram captured from a plurality of viewing perspectives,
    - wherein the plurality of viewing perspectives of the master hologram cover a full range of viewing angles and directions from which the hologram is likely to be observed during authentication, and
    - wherein each of the plurality of arbitrary viewing perspectives is not known or determined.

2. The method of claim 1, wherein the determination of whether the hologram is an authentic duplicate of a master hologram is provided via an in-app user interface on a user device.

3. The method of claim 2, wherein the user device is a smartphone.

4. The method of claim 1, wherein the hologram is provided on a document of value such as a passport, identity card, driving license, bank card, bank note or security label.

5. A non-transitory computer readable storage medium that stores a computer program comprising executable instructions which, when executed by at least one processor of a computer, cause the at least one processor to perform the method of claim 1.

6. A system for determining validity of a hologram, the system comprising:
    - a scanning device for capturing a plurality of images of a hologram from a respective plurality of arbitrary viewing perspectives; and
    - at least one processor configured to perform the method of claim 1.

7. The system of claim 6, wherein the scanning device is a smart phone equipped with a camera and a light source.

8. The system of claim 6, wherein the hologram exhibits parallax.

9. The method of claim 1, wherein the hologram exhibits parallax.

* * * * *